UNITED STATES PATENT OFFICE.

ALBERT HENNING, OF LEYTONSTONE, LONDON, ENGLAND.

NON-INFLAMMABLE VOLATILE LIQUID.

1,393,124.  Specification of Letters Patent.  Patented Oct. 11, 1921.

No Drawing.  Application filed August 9, 1920. Serial No. 402,313.

*To all whom it may concern:*

Be it known that I, ALBERT HENNING, a citizen of the United Kingdom of Great Britain and Ireland, and resident of 120 Harrow road, Leytonstone, London, E. 11., England, have invented certain new and useful Improvements in Non-Inflammable Volatile Liquids, of which the following is a specification, such as will enable others skilled in the art to which it appertains to make and use the same.

This invention relates to a non-inflammable liquid useful for several industrial and other purposes such for example as a solvent, a refrigerating agent or as a fire extinguisher.

The said liquid comprises a mixture of ethyl chlorid with methyl bromid, the said ethyl chlorid being either pure or of usual commercial quality which contains a small percentage of methyl chlorid, or methyl chlorid may be added.

Broadly, the invention may be described as consisting in rendering ethyl chlorid non-inflammable by the admixture with it of methyl bromid. The boiling points of these two liquids are comparatively close together so that the mixture of same results in a product which volatilizes in substantially even manner, that is to say the constituents of the preliminary vaporization are practically the same as those of the final vaporization and this very even action may be still further enhanced, if so desired, by the addition to the ethyl chlorid of methyl chlorid.

Non-inflammable mixtures of volatile liquids are known, but generally these consisted of two substances of substantially different boiling point, with the result that during the process of evaporation, either the vapor at the beginning or the residue at the end was rich in the inflammable constituent, and therefore the sought-after advantage of such a mixture was nullified. In a typical case for example, a mixture of toluene and trichlorethylene can be employed as a dry cleaning agent, and, although the mixture was non-inflammable, it is found that after the cleaned materials had been exposed and a part of the solvent allowed to evaporate, the vapor from the saturated material will burn readily.

As a refrigerating agent and for application in dry cleaning, and also for use as a solvent for the extraction of oils, or other extractable substances, and the like, it is important that the constitutents of the mixture should not separate readily during vaporization and this is a special feature of my invention.

Ethyl chlorid has a boiling point under ordinary atmospheric pressure of about $+12°$ C. or if mixed with about ten per cent. of methyl chlorid the mixture will boil at about $+8°$ C. and mixtures containing other proportions of methyl chlorid will have a boiling point between minus $24°$ C. and plus $12°$ C. according to the relative proportions of ethyl chlorid and methyl chlorid. The boiling point of methyl bromid is about $+4°$ C., so that a mixture of the $8°$ C. liquid or even the $12°$ C. liquid with that of the $4°$ C. would practically vaporize as a single liquid and the amount of separation during the vaporization under ordinary practical conditions would not permit of the development of inflammable properties at any stage of the evaporation.

The following may be cited as an example of my improved non-inflammable liquid, although I do not confine myself to these proportions, and may employ others.

A mixture of 90 parts ethyl chlorid, 10 parts methyl chlorid and 200 parts methyl bromid will boil at about $5°$ C., and a mixture of this composition may be vaporized, and during the process inflammable properties do not exist, either in the vapor or in the residual liquid.

The products according to this invention have a vapor pressure at ordinary temperatures above that of the atmosphere, and they may therefore be used in fire extinguishers even without any mechanical contrivance for projection, the vapor pressure sufficing to expel the products from the containers to a considerable distance, say ten feet.

The products according to my invention may be used as refrigerating agents, local anesthetics, solvents for extraction purposes, solvents as a vehicle for drugs, perfumes and the like, in fire extinguishers, and in dry cleaning operations, and in many of the known industrial processes in which a volatile liquid, having the power of dissolving organic substances is employed and coloring agents may be added if desired.

What I claim is:—

1. A liquid comprising a mixture of ethyl chlorid and methyl chlorid with double the quantity of methyl bromid.

2. A non-inflammable liquid comprising a mixture of ethyl chlorid and methyl bromid.

In witness whereof I have hereunto set my hand in presence of two witnesses.

ALBERT HENNING.

Witnesses:
FLORENCE GILBERT,
RICHARD CHARLES DEMINGTON.